July 8, 1952   J. COHEN   2,602,618
FISHING LINE CLEAT AND ROD SUPPORT
Filed April 20, 1950
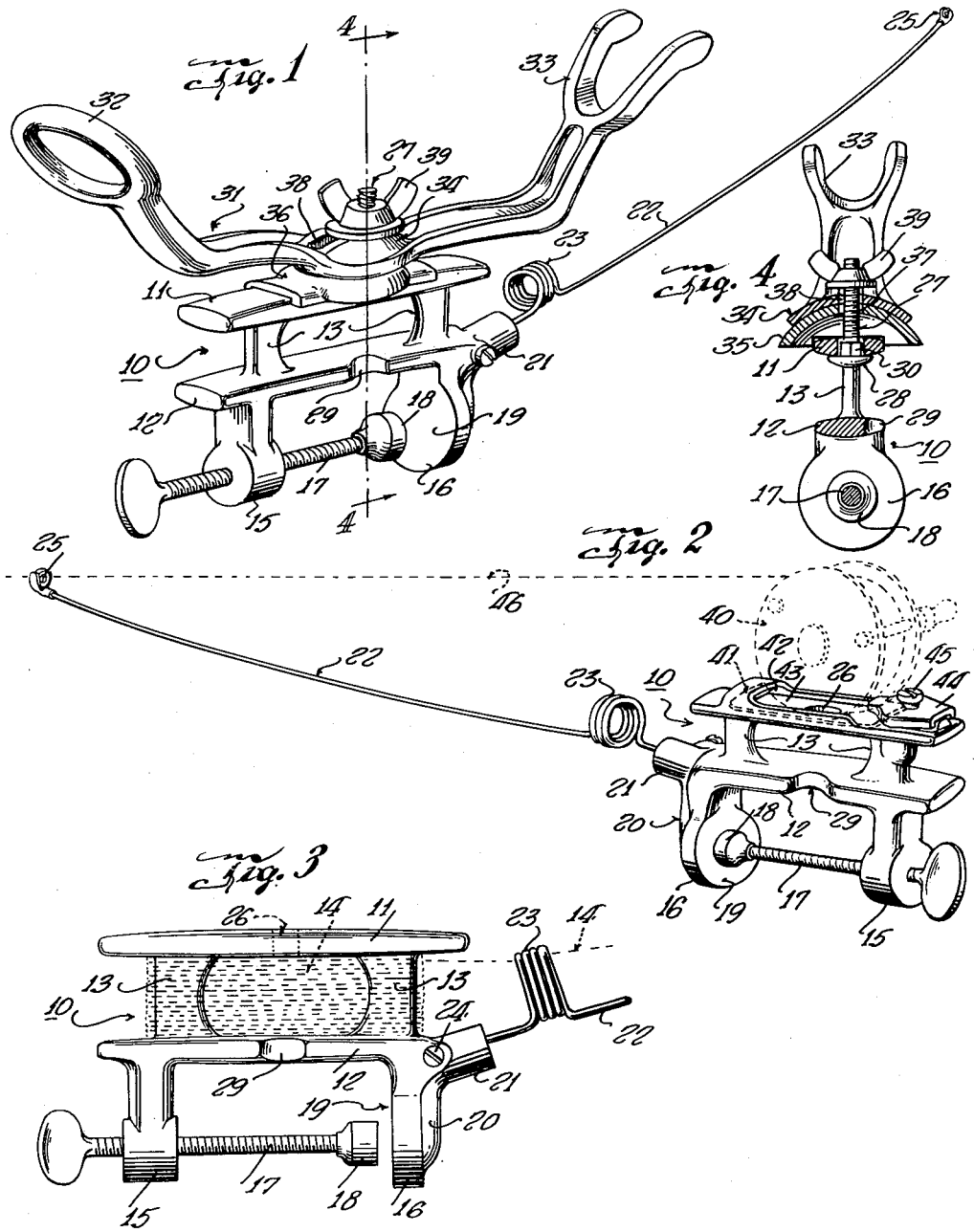
JOSEPH COHEN
INVENTOR.
BY
ATTORNEY Patented July 8, 1952

2,602,618

UNITED STATES PATENT OFFICE 2,602,618

FISHING LINE CLEAT AND ROD SUPPORT

Joseph Cohen, Irving, Tex.

Application April 20, 1950, Serial No. 157,021

1 Claim. (Cl. 248—40)

This invention relates to fishing equipment and more particularly to a fishing rod holder combining the characteristics of both casting and still fishing rod handles.

The principal object of the invention is to provide an all purpose rod holder consisting basically of a combined clamp and cleat, the latter serving as a means on which the fishing line is wound for tight line or still fishing or trolling, during which, the holder is secured to the gunwale of a boat or other support by means of the clamp which is an integral part of the cleat. The invention further provides a casting rod handle having a reel seat and clamp, the rod in the present case consisting of a length of spring steel wire having intermediate its ends a plurality of convolutions providing a resilient helix effective to exert a force tending to set the baited hook when a fish strikes during tight line or still fishing, trolling or casting.

Another object of the invention is to provide an all purpose fishing line and rod holder consisting of the clamp and cleat and including a bracket or saddle suitably formed to support the butt end of a fishing rod or pole, the said bracket or saddle being capable of rotational and oscillative displacement in relation to the holder and may be quickly and conveniently detached from the holder when the latter is to be used for other purposes described.

Other objects will appear as the description proceeds, taken in connection with the accompanying drawing, wherein:

Figure 1 is a perspective view of the invention in use as a pole or rod support.

Figure 2 is a perspective view of the invention slightly modified to accommodate a line reel and to adapt the same as a casting rod holder.

Figure 3 is a side elevational view showing the holder without the accessories revealed in the preceeding figures and illustrating its adaptation for still or tight line fishing, and Figure 4 is a sectional view taken on line 4—4 of Figure 1.

Continuing with a more detailed description of the drawing, reference is made primarily to Figures 1, 3 and 4 in which 10 denotes generally the base element or body which is preferably cast from light weight metal or molded from plastic and is formed with parallel and substantially coextensive plates 11 and 12, joined in spaced apart relationship by the legs 13, which are set inwardly from the ends of the plates 11 and 12. In this manner a cleat is formed on which may be wound the fishing line 14 when the device is converted to still or tight line fishing. In such cases, it is desirable that the line holder or body 10 be fixed to a convenient support such as the gunwale of a boat. For this purpose a clamp is provided through the depending legs 15 and 16, formed on the underside of the plate 12 and a screw rod 17 passing through a threaded aperture in the leg 15. The screw rod 17 carries a loosely mounted head 18 which is adapted to engage the gunwale which will be disposed between the head 18 and the flat face 19 of the companion leg 16, thus to clampingly hold the device in place.

Formed on the outer face of the leg member 16 is a boss 20 which serves as a reinforcement for a protuberance 21 cast integral with the body 10 and directed angularly upward and is axially bored to receive an end of a rod 22. The rod 22 is made preferably of spring steel wire but to increase its spring-back, a series of convolutions 23 is made in the rod nearest its anchored end which latter is secured by a set screw 24 entering through a threaded opening in the body 10 to bear against the end of the rod in the bore of protuberance 21. The outer end of the rod 22 has a loop or eye 25 through which the line 14 is adapted to be passed after having been wound on the cleat in the manner shown in Figure 3. In still or tight line fishing, it is preferred that the line be passed first through the convolutions 23 in the rod 22, thence through the eye 25 at the tip of the rod. By thus holding the line, the full energy of the spring-back of the rod is utilized to set the hook in the mouth of the fish after the initial pull is exerted by the latter in taking the bait.

It will be observed in Figure 3 that the plate 11 of the body has an aperture 26 therein midway of its ends which is preferably square. This aperture is adapted to accommodate a bolt 27 (Fig. 1), the head 28 of which bears against the underside of the plate 11, clearance being made therefor during insertion of the bolt by recessing the lower plate 12 at 29. The bolt is held against rotation by means of a squared portion 30 thereon next adjacent the head and which conforms to the shape of the aperture 26.

In certain cases, a fisherman may desire to relinquish his rod or pole and occupy himself otherwise while leaving his baited line in the water. A support for the rod or pole is provided through the medium of a bracket or saddle 31 (Fig. 1), one upwardly turned end of which is formed with a loop 23, adapted to receive the butt end of the pole or rod while the opposite end of the bracket, which is also turned angularly upward, is bifurcated at 33 to support the rod or pole. Midway between the ends of the bracket 31 is formed a hemispherical housing 34 which is adapted to rest on a correspondingly shaped support 35 (Fig. 4), which latter, in turn, is supported on the top plate 11 of the holder through an integral mounting 36. The bolt 27, disposable in the aperture 26 of the plate 11 extends through an opening 37 in the support 35 and a slot 38 in the housing 34 to hold these members in assembled relationship and for relative adjustment. A wing nut 39 is threaded upon the upper end of the bolt 27 and by loosening this nut, the bracket 31 may be adjusted to any desired position.

The foregoing description refers to the device as used in a stationary position, such as on the gunwale of a boat, during still or tight line fishing. In Figure 2 is shown a slightly modified example of the invention. Since the only variation of the form of the invention shown in Figure 2 from that revealed in the preceding figures is in the addition of a seat and clamp for a conventional reel 40, the same reference numerals are employed in Figure 2 to indicate like parts shown in Figures 1, 3 and 4. The reel 40 has an elongated base 41 one end of which is extended into a cavity 42 formed at the forward end of a seat 43 made in the top of the plate 11 of the body 10. The opposite end of the reel base 41 is secured by means of a lug or clamp 44 which is retained by a screw 45 passing through an aperture therein and is threaded into the plate 11.

The line 46 from the reel 40 is passed through the eye 25 of the rod 22 and the holder body 10 becomes the handle of the rod which is manipulated in the same manner as the conventional rod and reel in casting, and while the rod 22 is much shorter than the conventional casting rod, its flexibility as contributed largely by the convolutions 23, makes the device highly efficient in casting with artificial lures.

It is clearly evident from the foregoing that the base element 10 of the invention has many applications and may be converted from one adaptation to another quickly and without effort.

Manifestly, the construction as shown and described is capable of some modification and such modification as may be construed to fall within the scope and meaning of the appended claim is also considered to be within the spirit and intent of the invention.

What is claimed is:

In a combination fishing pole holder, line cleat and clamp, a body comprising a pair of parallel, spaced apart plates defining a cleat on which is adapted to be wound a fishing line, one of said plates having an aperture at its midsection, a pair of legs depending from the other of said plates, a screw rod threaded through an aperture in one of said legs for longitudinal displacement relative to the other of said legs, an axially bored protuberance integral with and extending angularly from one end of said body, a saddle having upturned ends, one of said ends being formed with a loop, the other of said ends being bifurcated, a slotted hemispherical housing on said saddle at its midsection, an apertured mounting member supported on said body corresponding in shape to and retained in said housing, and a bolt in the aperture of said plate extending through the aperture of said mounting member and the slot of said hemispherical housing for holding said saddle on said body for oscillative and rotative displacement on said mounting member.

JOSEPH COHEN.

REFERENCES CITED

The following references are of record in the file of this patent:

UNITED STATES PATENTS

| Number | Name | Date |
| --- | --- | --- |
| D. 147,462 | Leivo | Sept. 9, 1947 |
| 374,737 | Geils | Dec. 13, 1887 |
| 2,538,306 | Fox et al. | Jan. 16, 1951 |